May 27, 1930.  W. D. KNAPP  1,759,988
SPRAYING MACHINE
Filed April 11, 1928   2 Sheets-Sheet 1

INVENTOR
WILLIAM D. KNAPP
BY
ATTY.

May 27, 1930.  W. D. KNAPP  1,759,988
SPRAYING MACHINE
Filed April 11, 1928  2 Sheets-Sheet 2
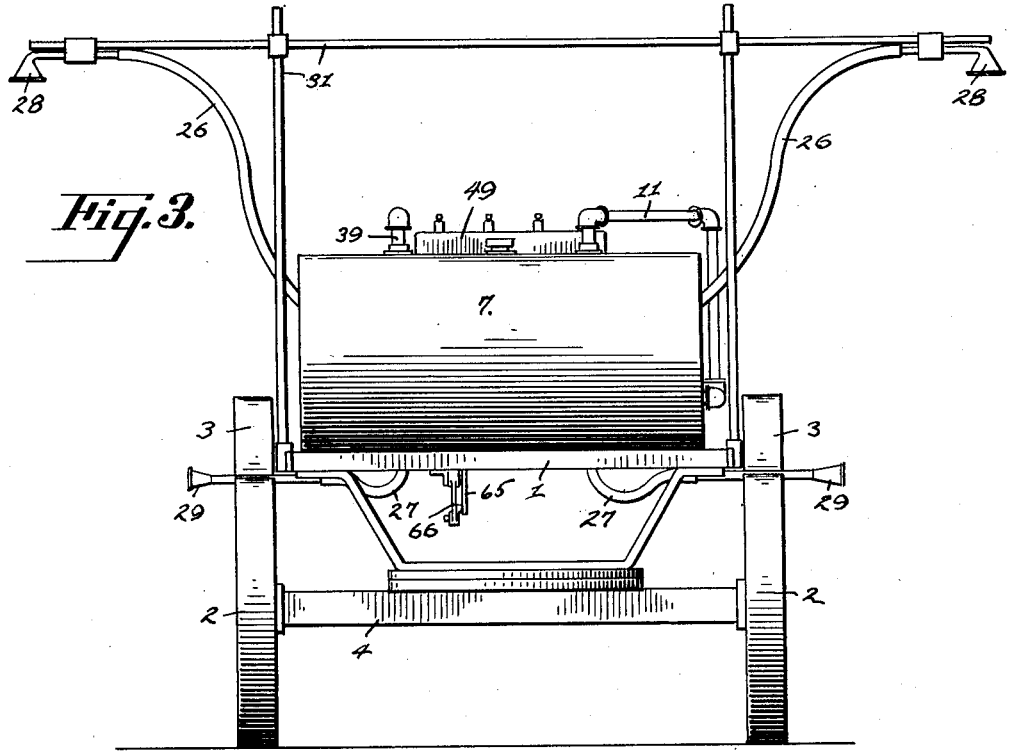
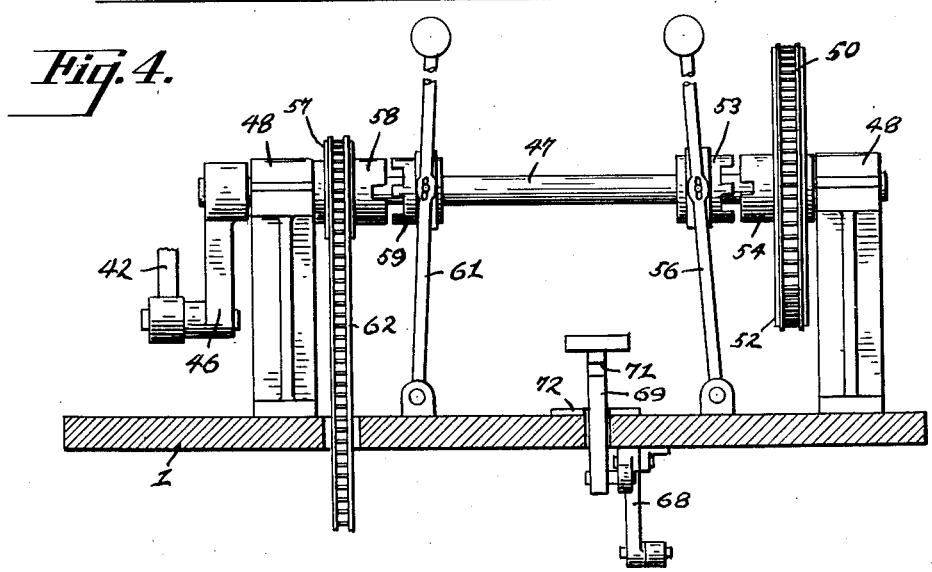
INVENTOR
WILLIAM D. KNAPP.
BY
ATTY.

Patented May 27, 1930

1,759,988

UNITED STATES PATENT OFFICE

WILLIAM D. KNAPP, OF SAN FRANCISCO, CALIFORNIA, ASSIGNOR OF ONE-HALF TO GEORGE DAWSETT, OF SAN FRANCISCO, CALIFORNIA

SPRAYING MACHINE

Application filed April 11, 1928. Serial No. 269,266.

My invention relates to improvements in spraying orchards, vineyards, and the like wherein spray pumping mechanism is arranged to be moved between rows of trees or vines and operated to spray a suitable spraying solution over the adjacent trees or vines.

The present invention is directed particularly to improvements in a mechanism such as disclosed in my former Patent, #933,039, patented August 31, 1909, and consists in an improved construction and arrangement of parts and the provision of a power motor arranged to be operated to drive the pump and to move the machine forwardly short distances when desired, and at the same time to permit the pumping mechainsm to be operated by the forward movement of the machine when propelled by a source of power other than the power motor of the machine.

The primary object is to provide an improved spraying machine of improved construction and arrangement.

Another object is to provide an improved machine which will afford an increased field of utility and facilitate the efficient spraying of orchards as well as low growths of shrubs, vines, and the like.

A further object is to provide an improved machine provided with a power motor and driving connections arranged to permit the operation of the machine when standing still as well as to operate the spraying mechanism by the forward movement of the machine independently of the power motor.

Another object is to provide an improved machine provided with a power motor arranged to operate a spraying mechanism, and also to provide a means for moving the vehicle forwardly.

A still further object is to provide an improved device of the character described which is simple and effective in its construction and operation and which will afford a wide range of utility at a nominal cost.

I accomplish these and other objects by means of the improved device disclosed in the drawings forming a part of the present application wherein like characters of reference are used to designate similar parts throughout the specification and drawings and in which—

Fig. 3 is a front elevation of the machine; and

Fig. 4 is a rear elevation of the power shaft and driving connections thereof, the figure being drawn upon a larger scale.

Figure 1:
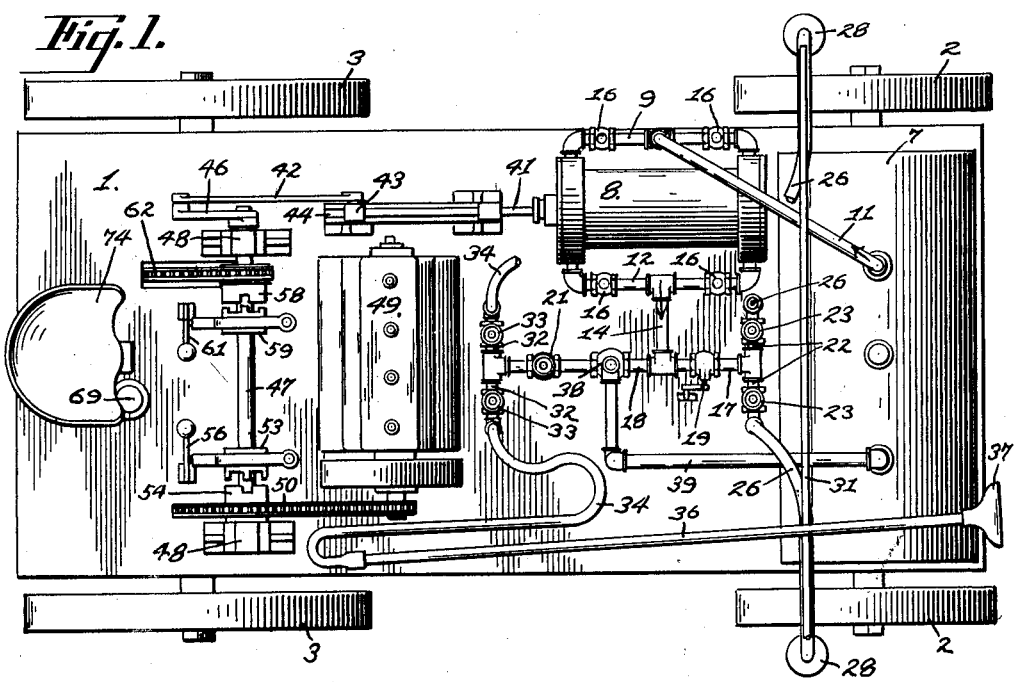
Fig. 1 is a plan view of my improved spraying machine.
Figure 2:
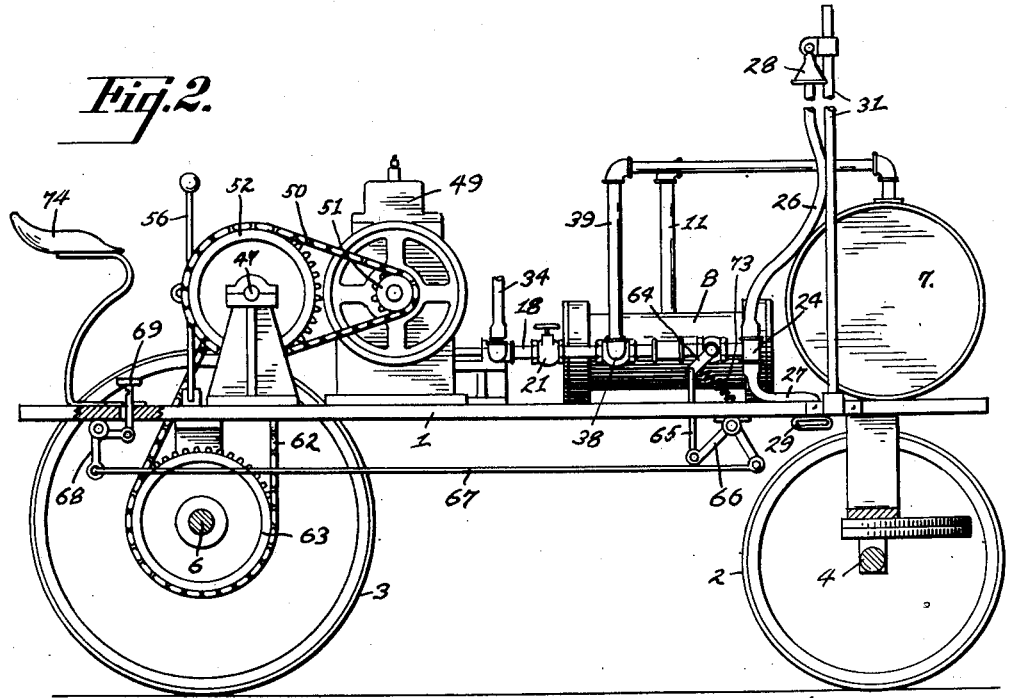
Fig. 2 is a side elevation of the machine, the near wheels being removed.

Referring to the drawings, the numeral 1 is used to designate a platform body supported upon front and rear pairs of wheels 2 and 3 mounted upon front and rear axels 4 and 6 respectively. Upon the top of the platform, preferably at the front thereof, is mounted a tank 7 arranged to receive a suitable supply of a spraying solution such as used in spraying orchards, vineyards, and the like.

A suitable pump 8 is mounted upon the platform 1 and provided with an intake connection 9 opening into the ends of the pump cylinder and connected into the tank 7 in any desired manner by means of a tubular connection 11. The pump 8 is also provided with an outlet connection 12 connected into the ends of the pump cylinder and arranged to deliver solution pumped from the tank to a main delivery connection 14. The intake connection 9 and the outlet connection 12 are each provided with check valves 16 of any suitable type arranged to the return flow of solution through the connections 9 and 12.

The main delivery connection is divided into two branch connections 17 and 18 provided with main control valves 19 and 21 respectively. The branch connection 17 is divided into two sub-branch connections 22 each provided with a valve 23 and terminating with outlet members 24 each having two outlet openings arranged to receive flexible spraying connections 26 and 27 provided with spraying nozzles 28 and 29 respectively. The connections 26 are extended upwardly and adjustably supported upon a frame 31 mounted adjacent the forward end of the platform 1, said connections being arranged to permit the nozzles to be supported in outwardly extending relation over the sides of the platform. The connections 27 are arranged to permit the nozzles 29 to be adjusted to outwardly extending positions adjacent the undersurface of the platform 1.

The branch connection 18 is divided into two outlet connections 32 each provided with a separate valve 33 and arranged to receive flexible connections 34 connected to relatively long rigid tubular members 36 terminating in suitable spraying nozzles 37.

A pressure release valve 38 is connected into one of the branch connections 17 or 18 adjacent the main delivery connection 14. The valve 38 operates within a fitting permitting an unobstructed flow of solution through the connection 17 or 18 and is arranged to normally close a side outlet in said fitting when the pump is operating under normal spraying pressure, said valve being arranged to be moved to open the side outlet to relieve excess pressure when the pressure of the pumped solution exceeds a predetermined pressure. A return connection 39 is connected to the side outlet receiving the valve 38 and to the tank 7 whereby solution passing the valve 38 when opened under an excess pressure is returned to the tank 7.

The pump 8 is preferably of the ordinary double acting type provided with a reciprocating piston having a piston stem 41 extending outwardly through a stuffing gland at one end of the pump cylinder. The piston is arranged to be reciprocated by means of a connecting rod 42 connected to a cross-head 43 secured to the stem 41 and carried by a suitable guide 44, the other end of said connecting rod being connected to a crank 46 secured upon the end of a drive shaft 47.

The shaft 47 is supported between suitable bearings 48. The shaft is arranged to be driven primarily by means of a power motor designated in general by the numeral 49, said motor preferably being an internal combustion engine of suitable size and design. The motor 49 is provided with a sprocket 51 and is arranged to drive the shaft 47 by means of a sprocket chain 50 mounted over the sprocket 51 and a sprocket 52 mounted upon the shaft. A clutch member 53 is feathered onto the shaft 47 adjacent the sprocket 52 and arranged to be moved into and out of engagement with a clutch member 54 secured to the sprocket 53 by means of a pivotally movable clutch lever 56.

The shaft 47 is also provided with a sprocket 57 rotatably mounted thereon and provided with a clutch member 58 arranged to be engaged by a corresponding clutch member 59 feathered onto the shaft 47 and arranged to be operated by means of a clutch lever 61. A drive chain 62 is mounted over the sprocket 57 and a sprocket 63 secured upon the rear axel 6, the rear wheels 3 being secured upon said axel for rotation therewith.

The valve 19 is arranged to be actuated by means of a lever 64 having a connecting rod 65 connected thereto, said rod 65 being connected at the opposite end to one arm of a bell crank 66. A connecting rod 67 engages the other arm of the bell crank 66 and is connected at its opposite end to one arm of a bell crank 68 arranged to be operated by means of a pedal 69 connected to the other arm of the bell crank 68. A notch 71 formed in the stem of the pedal 69 is arranged to engage a latch plate 72 to hold the pedal in depressed position and the valve 19 in open position when in operation. A spring 73 connected to the lever 64 operates to normally close the valve 19.

The pedal 69 and the clutch levers 56 and 61 are arranged adjacent a seat 74 secured upon the platform adjacent the back thereof whereby said pedal and levers will be conveniently accessible to an operator of the machine.

In operation, the machine is moved between adjacent rows of trees, shrubs, vines, or the like, and the pump operated to pump spraying solution from the tank 7 and spray said solution onto the adjacent rows of vegetation. For spraying shrubs, vines, and other relatively low growths requiring only a light spraying, the machine is drawn by horses or tractor between the rows. The motor 49 is allowed to remain idle and the clutch member 59 is moved into engagement with the clutch member 58 whereby the forward movement of the machine will cause the shaft 47 to be driven by the chain 62 and sprockets 63 and 57. The shaft 47, driven in this manner operates to drive the pump 8 by means of the crank 46 and connecting rod 42. So long as the machine is kept in motion the shaft will be driven to actuate the pump and thereby cause the solution to be pumped from the tank for spraying. While spraying growths of this kind, the valve 21 is closed and the pedal 69 is depressed to open the valve 19, thereby directing the pumped solution through the branch 17. When the machine is being moved between two rows of vegetation to be sprayed, both valves 23 are opened and solution will pass to both outlet members 24 and be divided between the flexible connections 26 and 27 connected to each, thereby causing the solution to be sprayed downwardly from the upper nozzles 28 onto the tops of the rows at each side of the machine, and at the same time to direct a portion of the solution through the lower nozzles 29 against the adjacent sides of the rows, thereby effectively sprayng both rows as the machne is moved steadily therebetween. If only one row is to be sprayed, the valve 23 controlling the flow of solution to the opposite side is closed.

In case the growth of vegetation in the rows is very great, the forward movement of the machine may not spray a sufficient amount of solution. In this case, the motor 49 is started, the clutches 53—54 and 58—59 are moved to release the shaft from the driving force of the axel 6 and to connect the motor to said shaft, thereby utilizing power from the motor to drive the shaft 47 and actuate the pump at a speed sufficient to obtain a thorough spraying.

In spraying orchards, the nozzles 28 and 29 are not sufficient to spray the trees. In this case, the motor 49 is operated to drive the shaft 47 and pump 8. The machine is moved to a desired position and the valve 21 opened and the valve 19 closed. Solution will now be delivered through the branch 18. One or both of the valves 33 are opened and solution directed through the connections 34 and 36 to the nozzles 37. The connections and nozzles are manipulated by one or more operators to spray the solution over the entire surface of the adjacent trees, the long rigid connections 36 permitting the nozzles to be elevated into the upper branches of the trees.

As considerable time is required to thoroughly spray each tree, the machine is advanced only at intervals from tree to tree. To avoid keeping a team or tractor idle while the machine is thus being moved about an orchard, the driving means is arranged to permit the shaft 47 to be connected to the axel 6 whereby power from the motor 49 may be utilized to propel the machine forward as desired. This permits the team or tractor to be released after the machine has been moved to the orchard, and the driving power of the motor utilized to effect the movement of the machine from tree to tree, this being made possible by a suitable reduction in speed through the chain and sprocket design without providing a motor of relatively high power such as would be necessary to utilize the motor as the primary driving power.

If the pump 8 is driven by the motor 49 at a speed so great that the pressure exceeds a predetermined amount, the valve 38 opens and permits the excess solution to be pumped back to the tank 7. When the machine is being moved from one tree to another, the valve 21 may be closed, in which case the solution is pumped to the tank until the valve is again opened.

From the above explanation, it will be noted that my improved machine is capable of efficient use for spraying low growths such as shrubs or vines or for spraying high growths such as orchard trees, and that power may be supplied either from the tractive force derived from the forward movement of the machine or from an independent motor which may be also utilized for moving the machine short distances. In this way, the machine is made capable of efficient use in service of substantially any kind, and the operation may be quickly and easily varied to attain the most economical and efficient service.

Having thus described my invention what I claim as new and desire to secure by Letters Patent is—

1. A spraying machine comprising the combination with a wheel supported platform, of a tank mounted upon the platform and arranged to store a supply of spraying solution; a pump; an intake connection connected between the tank and the pump; a delivery connection connected to the pump, said connection being divided into two main branches each provided with a plurality of outlet connections; spraying connections connected to each of the outlet connections; valve means for controlling the delivery of solution through each main branch; a power shaft; means connected between the shaft and the pump for actuating said pump; a power motor mounted upon the platform; means connected between the motor and shaft for driving the shaft; driving means connected between the shaft and the supporting wheels; and clutches mounted in connection with the power shaft and operable to independently connect or disconnect the motor or supporting wheels from the drive shaft whereby the pump may be driven by the motor or by the forward movement of the machine, or the machine may be driven forwardly by the motor.

2. A spraying machine comprising the combination with a wheel supported platform, of a tank mounted upon the platform and arranged to receive a supply of spraying solution; a pump arranged to draw solution from the tank; a plurality of spraying connections arranged to deliver solution from the pump for spraying; a drive shaft; means connected between the drive shaft and the pump for actuating the pump; tractive driving means actuated by a forward movement of the machine for actuating the shaft; a power motor mounted upon the platform; means connected between the motor and the shaft for actuating the shaft; and clutches arranged to connect and disconnect the tractive driving means and the motor independently from the shaft.

3. A spraying machine comprising the combination with a wheel supported platform, of a tank mounted upon the platform and arranged to receive a supply of spraying solution; a pump arranged to draw solution from the tank; a plurality of spraying connections arranged to deliver solution from the pump for spraying; a drive shaft; a motor mounted upon the platform; means for connecting the motor to the shaft; means for connecting the shaft to the pump for actuating said pump; means for so connecting the drive shaft with the supporting wheels that the wheels may be driven by the motor, or the shaft driven by the wheels independently of the motor; means for closing any but a desired one or more of the spraying connections; and a release connection provided with a pressure actuated valve for returning solution to the tank when the pressure of the pumped solution exceeds a predetermined amount.

4. The combination with a wheel supported vehicle and spray pumping and spraying mechanism, of a power motor; a drive shaft; means connecting the drive shaft with the pumping mechanism; a sprocket rotatably mounted upon the shaft; means engaging said sprocket and connected to the motor for rotating the sprocket; a clutch mounted upon the shaft in connection with the sprocket for driving the shaft from the sprocket; a second sprocket mounted upon the shaft; driving means for connecting said second sprocket with the wheels of the vehicle; and a second clutch mounted upon the shaft in connection with the second sprocket for securing the sprocket to the shaft.

In witness whereof, I hereunto set my signature.

WILLIAM D. KNAPP.